Figure 1:
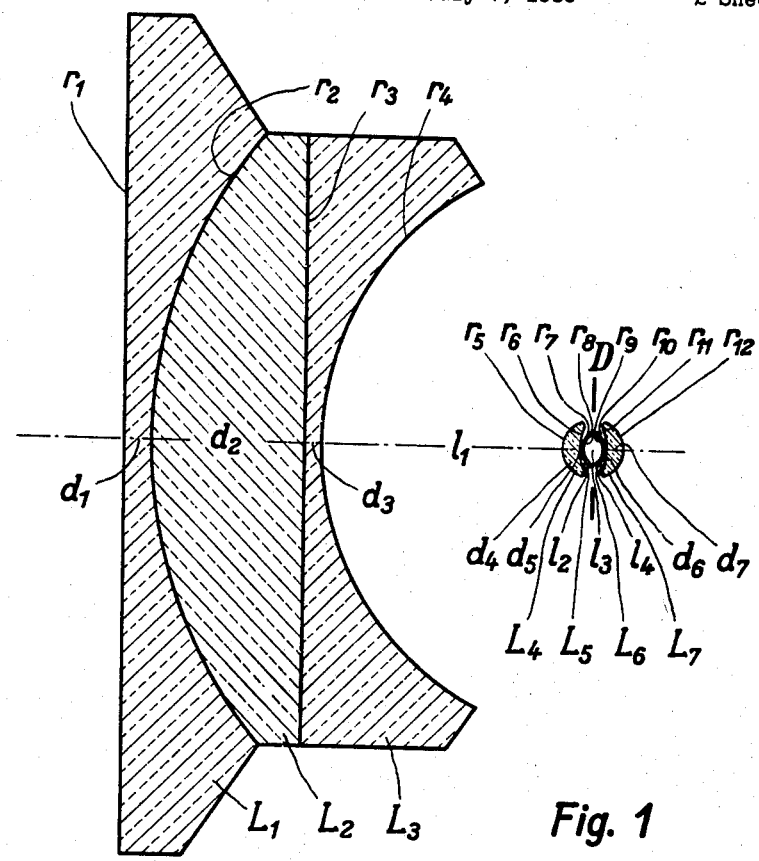

June 24, 1941.    R. RICHTER    2,247,068
ANASTIGMATIC PHOTOGRAPHIC OBJECTIVE
Filed July 7, 1939    2 Sheets-Sheet 1

|  |  | $n_d$ | $v$ |
|---|---|---|---|
| $r_1 = \infty$ | $d_1 = 5.3$ | 1.6228 | 56.9 |
| $r_2 = 86.1$ | $d_2 = 28.7$ | 1.6477 | 33.9 |
| $r_3 = \infty$ | $d_3 = 3.2$ | 1.6228 | 56.9 |
| $r_4 = 53.22$ | $l_1 = 45.65$ | | |
| $r_5 = 5.335$ | $d_4 = 3.27$ | 1.5163 | 64.0 |
| $r_6 = 10.815$ | $l_2 = 0.02$ | | |
| $r_7 = 4.112$ | $d_5 = 0.32$ | 1.7283 | 28.3 |
| $r_8 = 3.219$ | $l_3 = 3.70$ | | |
| $r_9 = 3.219$ | $d_6 = 0.32$ | 1.7283 | 28.3 |
| $r_{10} = 4.112$ | $l_4 = 0.02$ | | |
| $r_{11} = 10.815$ | $d_7 = 3.27$ | 1.5163 | 64.0 |
| $r_{12} = 5.335$ | | | |

Inventor:
Robert Richter

Patented June 24, 1941

2,247,068

UNITED STATES PATENT OFFICE 2,247,068

ANASTIGMATIC PHOTOGRAPHIC OBJECTIVE

Robert Richter, Jena, Germany, assignor to the firm of Carl Zeiss, Jena, Germany Application July 7, 1939, Serial No. 283,279
In Germany July 18, 1938

4 Claims. (Cl. 88—57)

The present invention concerns anastigmatic photographic objectives with strong barrel-shaped distortion for angles of view greater than 100°, which consist of a convergent and a divergent lens system at a comparatively great distance from each other. Objectives of this kind have become known repeatedly and, with a view to achieving the best possible images, a variety of forms have been suggested for the convergent system.

According to the present invention, a particularly advantageous combination of a convergent and a divergent lens system can be arrived at in the kind of objectives in question by using as a convergent system an objective that has at either side of the diaphragm plane a plurality of meniscal members the concave sides of which face the diaphragm plane, namely a divergent member next to this plane and at least one convergent member, the faces next to each other of a divergent and a convergent member being curved differently and the axial distances of those two faces of the divergent members which are next to the diaphragm plane being greater than four fifths of the arithmetic mean of the numerical values of the radii of curvature of these two faces. It is thus possible to obtain a sharply defining photographic objective which is of high rapidity even with angles of view of the required great magnitudes.

As photographic objectives to be used independently, there have become known convergent systems of the kind which is, in the present case, suggested for use in combination with a divergent lens system. These known objectives were to be used for exposures with comparatively great angles of view of, for instance, 100° and more. The aim was, however, to remove the distortion as much as possible, and it could not be anticipated that the convergent systems would, in other respects, retain their good qualities even if used for the purpose of a further increase of the angle of view in combination with a divergent system (in which case a strong barrel-shaped distortion is indispensable for obtaining sufficient brilliancy in the margin of the image). Objectives of the kind used in the present invention, in so far as they were combined with additional systems, had the purpose to counteract the errors of distortion of the convergent system.

As it is not possible, as a rule, to prevent the image field curvature in the virtual image projected by the divergent system of an objective according to the invention, the convergent system is to be constructed in such a manner as to compensate for this image field curvature. Colour defects of the divergent system can be avoided, however, by composing this system of at least a divergent lens facing the object and a convergent lens which lies next to this divergent lens and whose Abbe number $\nu$ is smaller than that of this divergent lens, and by providing that that side of the divergent system which faces the convergent system is concave.

To arrive at a specially thorough removal of the image errors, it has proved to be convenient to provide that the convergent system is faced by the concave sides of all those faces of the divergent system whose radii of curvature are smaller than the focal length of this system. By adhering to this condition as well as to the aforesaid condition for avoiding colour defects of the divergent system, it has proved to be even possible to compose this system of only the divergent lens facing the object and a convergent meniscus cemented thereto, the divergent lens having to be in this case approximately a plano-concave lens the approximately plane side of which faces the object.

Figure 2:
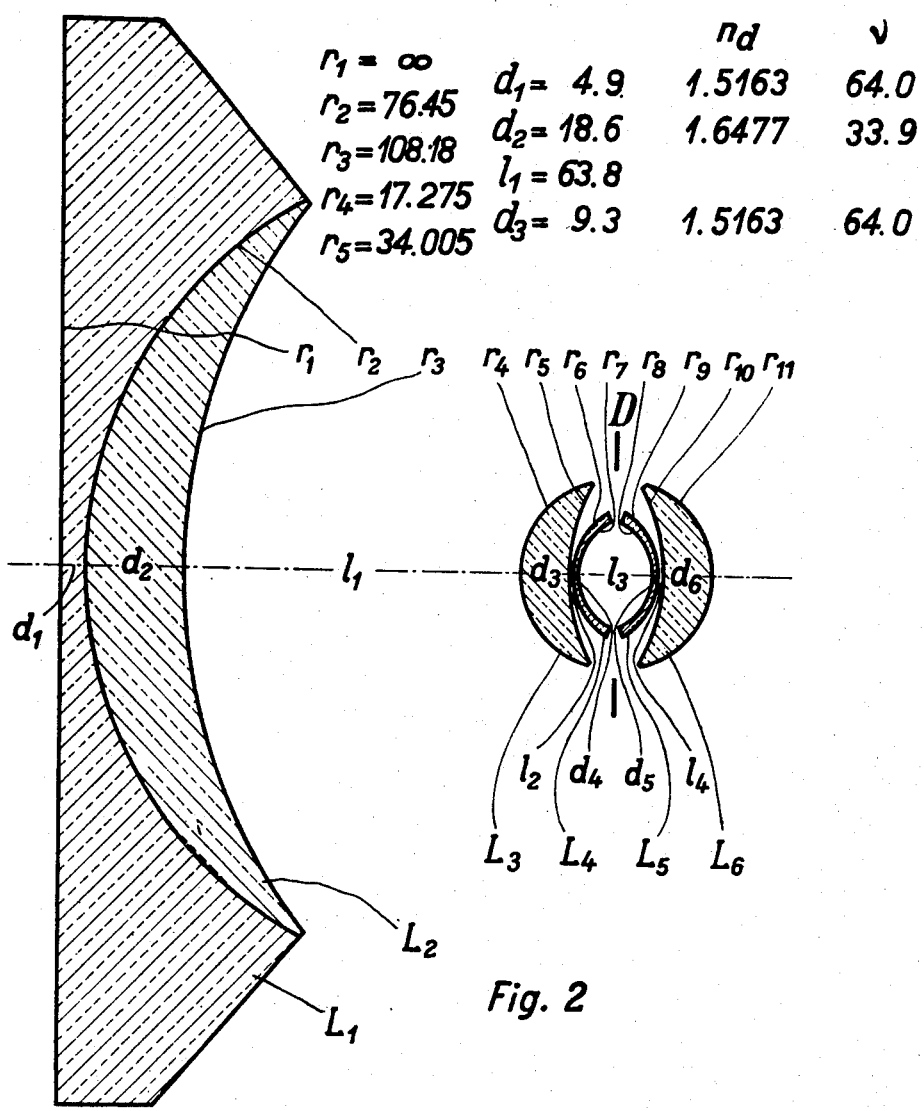

The accompanying drawings and the following tables refer to two constructional examples of objectives according to the invention. In the drawings, Figures 1 and 2 illustrate sections through the optical axes of the objective according to the first and the objective according to the second example, respectively. The Tables 1 and 2 refer to the dimensions and the kinds of glass of the lenses of these two examples.

The objective according to Figure 1 consists of a divergent system, which faces the object and comprises the cemented lenses $L_1$, $L_2$ and $L_3$, and a convergent system, which comprises the lenses $L_4$, $L_5$, $L_6$ and $L_7$. Between the lenses $L_5$ and $L_6$ is disposed a diaphragm D. The dimensions in millimetres and the kinds of glass are as follows:

Table 1

| Radii | Thicknesses and distances | Kinds of glass | |
|---|---|---|---|
| | | $n_d$ | $\nu$ |
| $r_1 = \infty$ | | | |
| | $d_1 = 5.3$ | 1.6228 | 56.9 |
| $r_2 = 86.1$ | | | |
| | $d_2 = 28.7$ | 1.6477 | 33.9 |
| $r_3 = \infty$ | | | |
| | $d_3 = 3.2$ | 1.6228 | 56.9 |
| $r_4 = 53.22$ | | | |
| | $l_1 = 45.65$ | | |
| $r_5 = 5.335$ | | | |
| | $d_4 = 3.27$ | 1.5163 | 64.0 |
| $r_6 = 10.815$ | | | |
| | $l_2 = 0.02$ | | |
| $r_7 = 4.112$ | | | |
| | $d_5 = 0.32$ | 1.7283 | 28.3 |
| $r_8 = 3.219$ | | | |
| | $l_3 = 3.70$ | | |
| $r_9 = 3.219$ | | | |
| | $d_6 = 0.32$ | 1.7283 | 28.3 |
| $r_{10} = 4.112$ | | | |
| | $l_4 = 0.02$ | | |
| $r_{11} = 10.815$ | | | |
| | $d_7 = 3.27$ | 1.5163 | 64.0 |
| $r_{12} = 5.335$ | | | |

The convergent system, which is symmetric, has a focal length of +25.0 millimetres, and the divergent system has a focal length of −88.1 millimetres. The rear principal point of the divergent system is at a distance of approximately 51.7 millimetres in front of the front principal point of the convergent system, the entire vertex length of which is 10.92 millimetres. The objective has a focal length of 19.2 millimetres, and at a diaphragm diameter of 3.34 millimetres, a ratio of aperture of 1:6.3, and an angle of view of 180°.

The objective according to Figure 2 consists of a divergent system, which faces the object and comprises the cemented lenses $L_1$ and $L_2$, and a convergent system, which comprises the single lenses $L_3$, $L_4$, $L_5$ and $L_6$. The diaphragm D is disposed between the lenses $L_4$ and $L_5$. The dimensions in millimetres and the kinds of glass are as follows:

Table 2

| Radii | Thicknesses and distances | Kinds of glass | |
|---|---|---|---|
| | | $n_d$ | $\nu$ |
| $r_1 = \infty$ | | | |
| | $d_1 = 4.9$ | 1.5163 | 64.0 |
| $r_2 = 76.45$ | | | |
| | $d_2 = 18.6$ | 1.6477 | 33.9 |
| $r_3 = 108.18$ | | | |
| | $l_1 = 63.8$ | | |
| $r_4 = 17.275$ | | | |
| | $d_3 = 9.3$ | 1.5163 | 64.0 |
| $r_5 = 34.005$ | | | |
| | $l_2 = 0.07$ | | |
| $r_6 = 13.49$ | | | |
| | $d_4 = 1.1$ | 1.7283 | 28.3 |
| $r_7 = 10.705$ | | | |
| | $l_3 = 13.98$ | | |
| $r_8 = 10.705$ | | | |
| | $d_5 = 1.1$ | 1.7283 | 28.3 |
| $r_9 = 13.49$ | | | |
| | $l_4 = 0.07$ | | |
| $r_{10} = 34.005$ | | | |
| | $d_6 = 9.3$ | 1.5163 | 64.0 |
| $r_{11} = 17.275$ | | | |

The convergent system, which is symmetric, has a focal length of +80.4 millimetres and the divergent system has a focal length of −240.5 millimetres. The rear principal point of the divergent system is at a distance of approximately 80.4 millimetres in front of the front principal point of the convergent system, the entire vertex length of which is 34.92 millimetres. The objective has a focal length of 80.4 millimetres, and at a diaphragm diameter of 12.0 millimetres, a ratio of aperture of 1:6.3, and an angle of view of 136°.

I claim:

1. An anastigmatic photographic objective with barrel-shaped distortion for angles of view greater than 100°, consisting of a divergent lens system facing the object, and a convergent lens system, the two systems being in axial alignment and axially separated, the distance between the rear principal point of the divergent system and the front principal point of the convergent system being greater than half and smaller than four times the focal length of the convergent system, said convergent system being an objective having at either side of the diaphragm plane a group of axially spaced meniscal members, the concave sides of which facing the diaphragm plane, that member of each group next to the diaphragm plane being divergent, and at least one member of each group being convergent, whereby on each side of the diaphragm plane those refractive surfaces of the divergent and the convergent members facing each other are differently curved, and the axial distance apart of those two faces of the divergent members which are next to the diaphragm plane being greater than four fifths of the arithmetic mean of the numerical values of the radii of curvature of said two faces.

2. An objective according to claim 1, said divergent system being composed of at least a divergent lens facing the object and a convergent lens next to said divergent lens, the Abbe number $\nu$ of said convergent lens being smaller than that of said divergent lens, and that side of said divergent system which faces said convergent system being concave.

3. An objective according to claim 1, all those concave sides of said divergent system whose radii of curvature are smaller than the focal length of said divergent system facing the convergent system.

4. An objective according to claim 1, said divergent system being composed of a divergent lens next to the object, said divergent lens having an approximately plane side facing the object and a convergent meniscus cemented to said divergent lens, the Abbe number $\nu$ of said meniscus being smaller than that of said divergent lens.

ROBERT RICHTER.